US012780629B2

(12) United States Patent
Goto

(10) Patent No.: US 12,780,629 B2
(45) Date of Patent: Nov. 3, 2026

(54) STACKER CRANE

(71) Applicant: Murata Machinery, Ltd., Kyoto (JP)

(72) Inventor: Fumiki Goto, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 121 days.

(21) Appl. No.: 18/994,253

(22) PCT Filed: Jun. 7, 2023

(86) PCT No.: PCT/JP2023/021140
§ 371 (c)(1),
(2) Date: Jan. 14, 2025

(87) PCT Pub. No.: WO2024/018773
PCT Pub. Date: Jan. 25, 2024

(65) Prior Publication Data
US 2026/0015215 A1 Jan. 15, 2026

(30) Foreign Application Priority Data
Jul. 20, 2022 (JP) ................................ 2022-115385

(51) Int. Cl.
*B66F 9/07* (2006.01)

(52) U.S. Cl.
CPC .................................. *B66F 9/072* (2013.01)

(58) Field of Classification Search
CPC .............................. B66F 9/072; B65G 1/0407
See application file for complete search history.

(56) References Cited

U.S. PATENT DOCUMENTS 9,725,288 B2 * 8/2017 Koyama ................ B66F 9/072
10,815,054 B2 * 10/2020 Tsukamoto .............. B65G 1/04
2015/0210519 A1 7/2015 Koyama

FOREIGN PATENT DOCUMENTS

JP 2004034913 A * 2/2004

* cited by examiner

*Primary Examiner* — Thomas C Diaz
(74) *Attorney, Agent, or Firm* — Keating & Bennett, LLP

(57) ABSTRACT

A stacker crane includes a traveling assembly including a drive wheel being at least one of a first wheel and a second wheel opposing each other across a rail and a mover to move the drive wheel, the first wheel, and the second wheel. The mover includes first and second contact pressure adjusters to adjust a contact pressure of the drive wheel against the rail by moving the drive wheel to cause the first wheel and the second wheel to move farther away from or closer to each other. One of the first and second contact pressure adjusters is on one side of the drive wheel in a traveling direction of the traveling assembly, and the other of the first and second contact pressure adjusters is on the other side of the drive wheel in the traveling direction.

6 Claims, 6 Drawing Sheets

STACKER CRANE

BACKGROUND OF THE INVENTION

1. Field of the Invention

The present invention relates to stacker cranes.

2. Description of the Related Art

For example, Japanese Patent No. 6011628 discloses a stacker crane that, by using a biasing mechanism to bias one of a pair of wheels having a rail therebetween toward the rail, a drive wheel can be pressed against the rail. In such a stacker crane, the contact pressure of the drive wheel against the rail can be increased, and thus slipping of the drive wheel on the rail can be reduced, and faster traveling and higher acceleration/deceleration can be achieved. In addition, in such a stacker crane, by releasing the contact pressure of the drive wheel against the rail, the stacker crane can be manually moved.

SUMMARY OF THE INVENTION

However, the conventional stacker crane's biasing mechanism is provided in part in a traveling direction of the drive wheel. Thus, it may be difficult for an operator's hand to reach the biasing mechanism depending on a stopping position or the like of the stacker crane, and time and effort may be required for adjustment of the biasing mechanism.

Given these circumstances, example embodiments of the present invention provide stacker cranes that each improve workability when a contact pressure of a drive wheel is adjusted.

A stacker crane according to an example embodiment of the present invention includes a traveling assembly including a drive wheel being at least one of a first wheel and a second wheel opposing each other across a rail, and a mover to move the drive wheel, wherein the mover includes a first contact pressure adjuster and a second contact pressure adjuster to adjust contact pressure of the drive wheel against the rail by moving the drive wheel farther away from or closer to each other, and one of the first contact pressure adjuster and the second contact pressure adjuster being closer to one side in a traveling direction of the traveling assembly than the drive wheel and another of the first contact pressure adjuster and the second contact pressure adjuster being closer to another side in the traveling direction than the drive wheel.

The stacker crane of this configuration is provided with the first contact pressure adjuster and the second contact pressure adjuster to adjust the contact pressure of the drive wheel against the rail on both sides in the traveling direction of the first wheel and the second wheel. This enables an operator to adjust the contact pressure of the drive wheel from both sides in the traveling direction of the drive wheel. Consequently, workability when the contact pressure of the drive wheel is adjusted is improved.

In a stacker crane according to an example embodiment of the present invention, the mover may include a rotator that is rotatable about a rotating shaft as a rotation center with respect to a main body of the traveling assembly and to which an axle of the first wheel is fixed, and the first contact pressure adjuster may be operable to move a portion of the rotator in a direction away from the rail or a direction closer to the rail and the second contact pressure adjuster may be operable to move another portion different from the portion of the rotator in a direction away from the rail or a direction closer to the rail. With this configuration, the operator can move the first wheel and the second wheel in a direction farther away from each other or in a direction closer to each other from both sides in the traveling direction of the wheels by a simple configuration.

In a stacker crane according to an example embodiment of the present invention, the rotating shaft may be closer to the rail than the axle of the first wheel, and the traveling assembly may be assembled in an order of the first contact pressure adjuster, the rotating shaft, the axle of the first wheel, and the second contact pressure adjuster from the one side in the traveling direction. With this configuration, the contact pressure of the drive wheel can be adjusted by a simple configuration.

In a stacker crane according to an example embodiment of the present invention, the first contact pressure adjuster is operable to move the first wheel away from the rail by moving a first portion of the rotator closer to the rail, and the second contact pressure adjuster is operable to move the first wheel closer to the rail by moving a second portion different from the first portion of the rotator closer to the rail. With this configuration, the contact pressure of the drive wheel can be adjusted by a simple configuration.

A stacker crane according to an example embodiment of the present invention may further include a mast at an end on the one side in the traveling direction of the traveling assembly and extending in a vertical direction and a transfer portion movable in the vertical direction along one side surface on the other side in the traveling direction on the mast, in which the first wheel and the second wheel may be between an end on the other side in the traveling direction of the traveling assembly and the mast in the traveling direction. With this configuration, the first wheel and the second wheel are near a central portion of the traveling assembly, which increases the distance from both ends of the traveling assembly to the first wheel and the second wheel in the traveling direction. However, in a stacker crane according to an example embodiment of the present invention, the first contact pressure adjuster and the second contact pressure adjuster are provided on both sides of the traveling assembly in the traveling direction, and thus the contact pressure adjustment for the drive wheel can be easily performed even in a configuration in which the first wheel and the second wheel are provided near the central portion of the traveling assembly.

In a stacker crane according to an example embodiment of the present invention, the traveling assembly may include a lower traveling portion at a lower end of the mast in the vertical direction and an upper traveling portion at an upper end of the mast in the vertical direction, and the mover may be provided in the upper traveling portion. With this configuration, workability when the contact pressure of the drive wheel in the upper traveling portion at the upper end of the mast in the vertical direction is adjusted can be improved.

Example embodiments of the present invention improve workability when a contact pressure of a drive wheel is adjusted.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

The following describes a stocker 1 in which a stacker crane 6 according to an example embodiment is arranged with reference to the accompanying drawings. In the description of the drawings, the same components are denoted by the same symbols, and duplicate descriptions are omitted. For the convenience of description, an X direction, a Y direction, and a Z direction are defined in FIG. 1 to FIG. 6. The X direction is a direction matching a traveling direction of the stacker crane, the Y direction is a direction orthogonal to the X direction and a direction matching a width direction of a stocker main body 3. The Z direction is a direction orthogonal to both the X direction and the Y direction and a direction matching the vertical direction.

Figure 1:
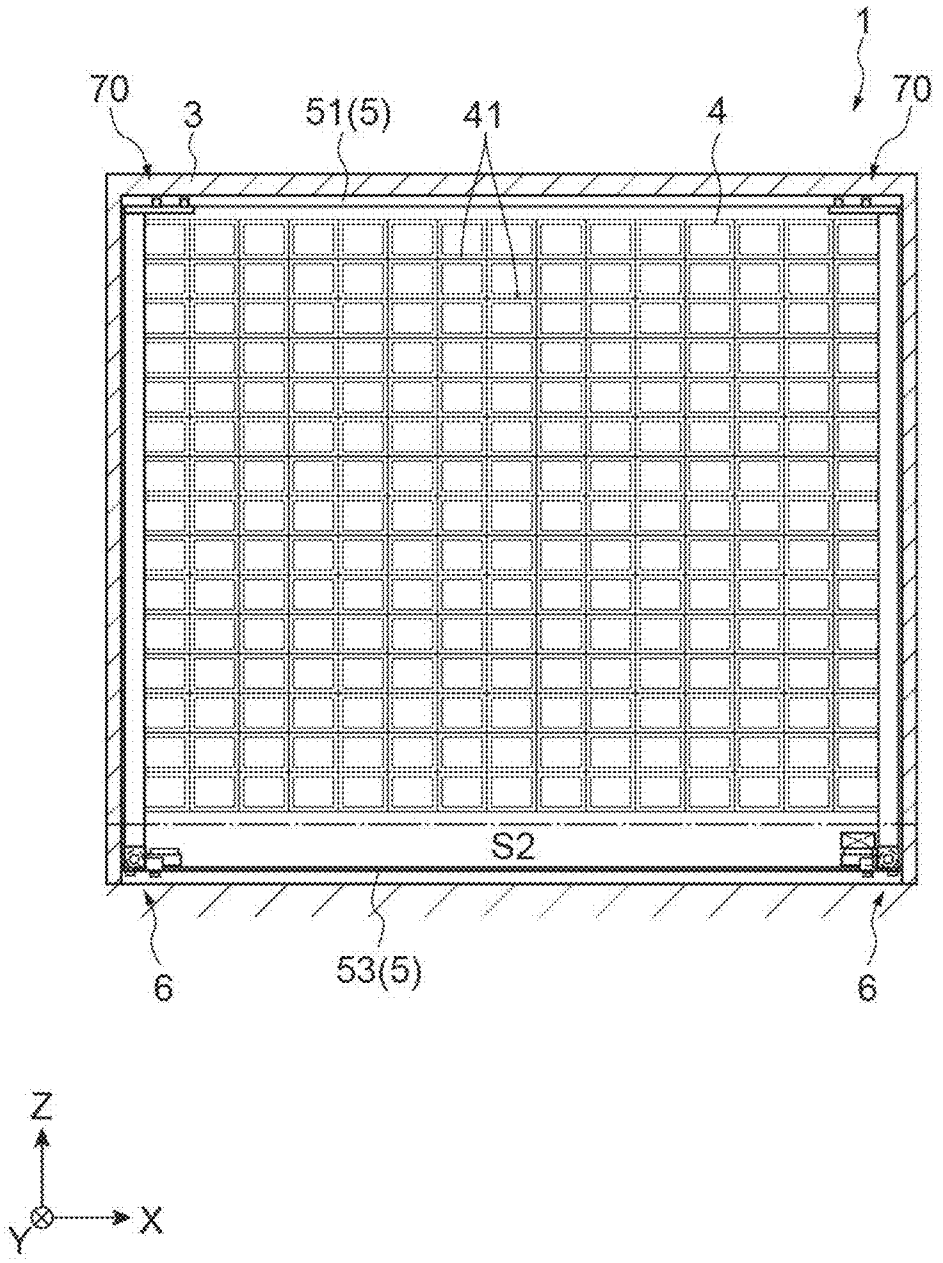
FIG. 1 is a side view illustrating a schematic configuration of a stocker in which a stacker crane according to an example embodiment of the present invention is provided.
Figure 2:
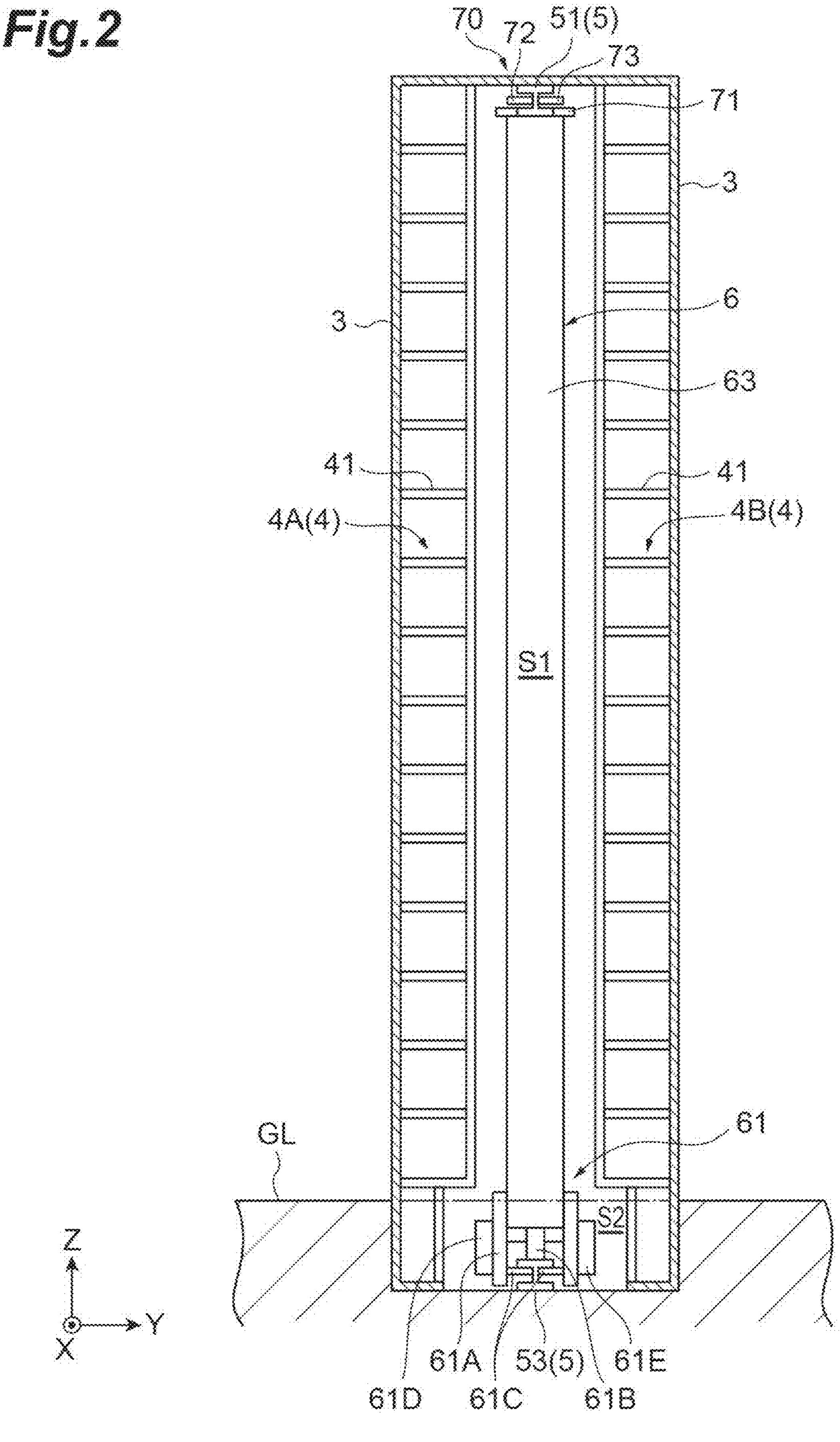
FIG. 2 is a side view illustrating a schematic configuration of the stocker in FIG. 1.

The stocker 1, for example, stores an article having been transported by a transport apparatus. The article is, for example, a container such as a front opening unified pod (FOUP) housing wafers to be processed in semiconductor manufacturing apparatuses or liquid crystal manufacturing apparatuses or a reticle pod housing reticles to be used in semiconductor manufacturing apparatuses or liquid crystal manufacturing apparatuses. As illustrated in FIG. 1 and FIG. 2, the stocker 1 includes a stocker main body 3, a rack 4, a rail 5, and the stacker crane 6.

The stocker main body 3 preferably has a housing shape (for example, a hollow rectangular parallelepiped shape) surrounding a certain area extending in the X direction. The outer shape of the stocker main body 3 is defined by a frame and a panel, which are not illustrated. The stocker main body 3 includes an underfloor area S2, which is part of an internal area of the stocker main body 3 at a position lower than a floor surface GL outside the stocker main body 3.

The stocker main body 3 houses racks 4A and 4B and two stacker cranes 6. The racks 4A and 4B oppose each other in the Y direction across a traveling area S1 of the stacker cranes 6. Each of the racks 4A and 4B includes a plurality of shelves 41 on which articles can be placed. In each of the racks 4A and 4B, the shelves 41 are arranged along the X direction and the Y direction.

The rail 5 includes an upper rail (a rail) 51 and a lower rail 53. The upper rail 51 and the lower rail 53 are inside the stocker main body 3 and oppose each other in the vertical direction. The upper rail 51 extends in the X direction, which is the horizontal direction. The upper rail 51 is directly mounted on the ceiling or the like or mounted on the ceiling or the like via a suspension. Like the upper rail 51, the lower rail 53 also extends in the X direction, which is the horizontal direction. The lower rail 53 is directly mounted on the ground or mounted on the ground via a support.

Figure 3:
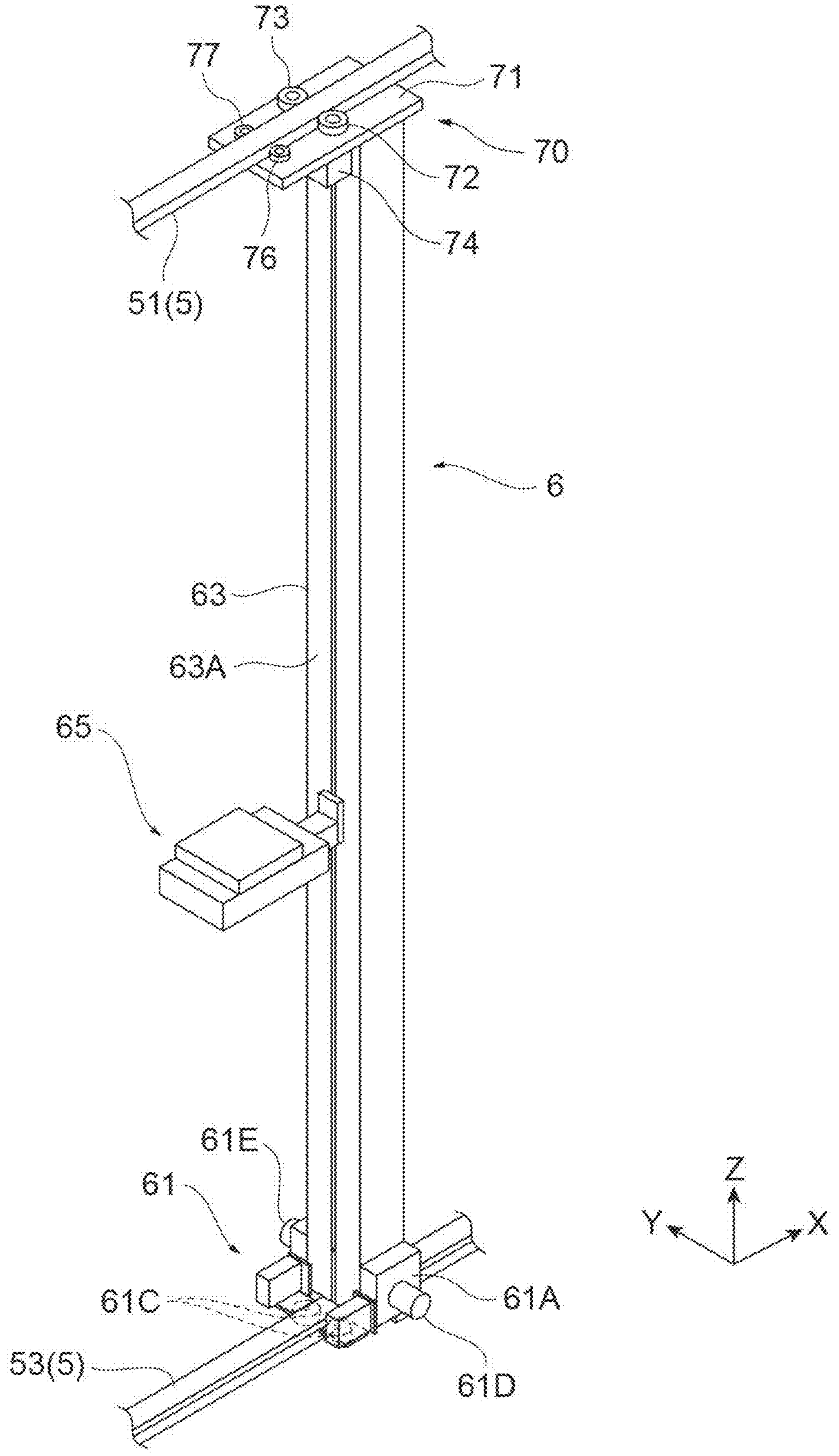
FIG. 3 is a perspective view illustrating a stacker crane according to an example embodiment of the present invention.

As illustrated in FIG. 2 and FIG. 3, each of the two stacker cranes 6 and 6 includes a lower traveling portion 61, a mast 63, a transfer portion 65, and an upper traveling portion (a traveling assembly) 70. Since the two stacker cranes 6 and 6 have the same configuration, they are described below simply as the stacker crane 6. In the following description, the stacker crane 6 on the right side in FIG. 1 is illustrated and described.

The lower traveling portion 61 travels along the lower rail 53. The lower traveling portion 61 includes a lower main body 61A, a drive wheel 61B, a pair of driven wheels 61C and 61C, a motor 61D for traveling, and a motor 61E for lifting and lowering. The lower main body 61A includes a frame and a plate and supports the drive wheel 61B, the pair of driven wheels 61C and 61C, the motor 61D for traveling, and the motor 61E for lifting and lowering. The drive wheel 61B is able to roll on an upper surface of the lower rail 53. The pair of driven wheels 61C and 61C are provided so as to be able to roll with side surfaces of the lower rail 53 put therebetween. The motor 61D for traveling is a driving source for the drive wheel 61B. The motor 61E for lifting and lowering is a driving source for the transfer portion 65.

The mast 63 is a columnar body extending along the vertical direction. The mast 63 is erected from the lower traveling portion 61. An upper end of the mast 63 is connected to the upper traveling portion 70. The mast 63 is at an end of the lower traveling portion 61 on one side in the X direction (a traveling direction of the stacker crane 6) and at an end of the upper traveling portion 70 on the one side in the X direction. In other words, the lower traveling portion 61 and the upper traveling portion 70 project toward the other side in the X direction from the mast 63.

The transfer portion 65 transfers articles to and from the shelves 41 and also transfers articles to and from an entry-and-exit port (not illustrated) provided in the stocker main body 3. The transfer portion 65 is able to be lifted and lowered along one side surface (a lifting and lowering face 63A) of the mast 63. More specifically, the transfer portion 65 is provided on the other side of the mast 63 in the X direction, that is, the same side as the direction in which the lower traveling portion 61 and upper traveling portion 70 protrude from the mast 63. The transfer portion 65 is driven by the motor 61E for lifting and lowering.

As illustrated in FIG. 3 to FIG. 6, the upper traveling portion 70 includes an upper main body 71, a first drive wheel (a first wheel) 72, a second drive wheel (a second wheel) 73, a mover 80, a motor 74 for the first drive wheel, a motor 75 for the second drive wheel, a first driven wheel 76, and a second driven wheel 77.

The upper main body 71 includes a frame and a plate and supports the first drive wheel 72, the second drive wheel 73, the mover 80, the motor 74 for the first drive wheel, the motor 75 for the second drive wheel, the first driven wheel 76, and the second driven wheel 77. An end of the upper main body 71 on the one side in the X direction is connected to the mast 63. As described above, the upper traveling portion 70 protrudes from the mast 63. In the following, for the convenience of description, an end of the upper main body 71 closer to the mast 63 is referred to as a basal end 71B, and an end of the upper main body 71 on the opposite side from the basal end 71B is referred to as a distal end 71E.

The first drive wheel 72 and the second drive wheel 73 oppose each other in the Y direction and are adjusted so as to put (hold) the upper rail 51 therebetween when the upper traveling portion 70 travels. The first drive wheel 72 and the second drive wheel 73 are provided in a central portion of the upper main body 71 in the X direction. More specifically, the first drive wheel 72 and the second drive wheel 73 are between the distal end 71E of the upper main body 71 and the lifting and lowering surface 63A of the mast 63 in the X direction.

The first drive wheel 72 is a drive wheel driven by the motor 74 for the first drive wheel. The first drive wheel 72 has its axle 72A fixed to the mover 80 (a rotator 81), which is described in detail below. The second drive wheel 73 is a drive wheel driven by the motor 75 for the second drive wheel. The second drive wheel 73 has its axle 73A fixed to the upper main body (the main body of the traveling assembly) 71.

Figure 4:
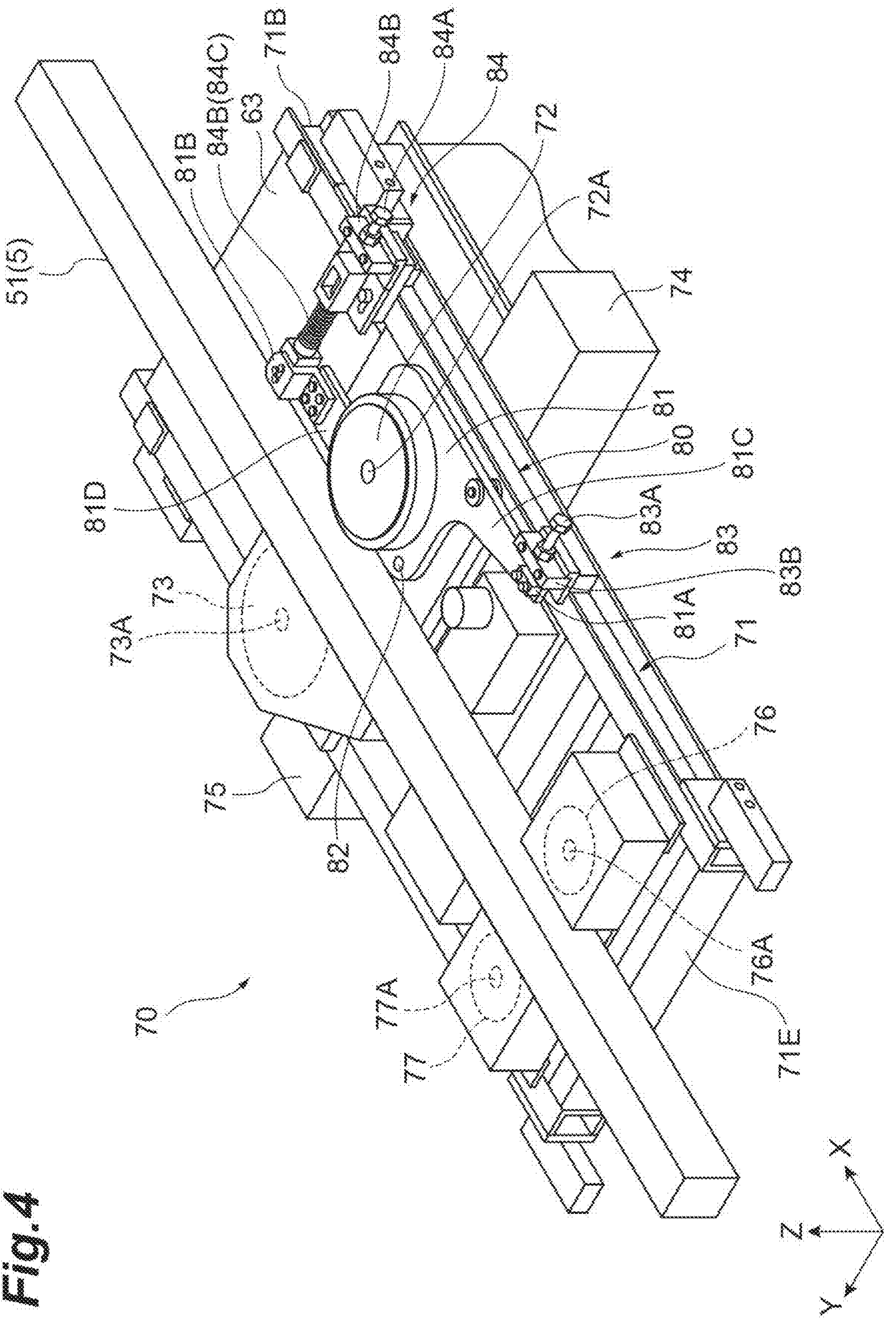
FIG. 4 is a perspective view of an upper traveling portion in FIG. 3.
Figure 5:
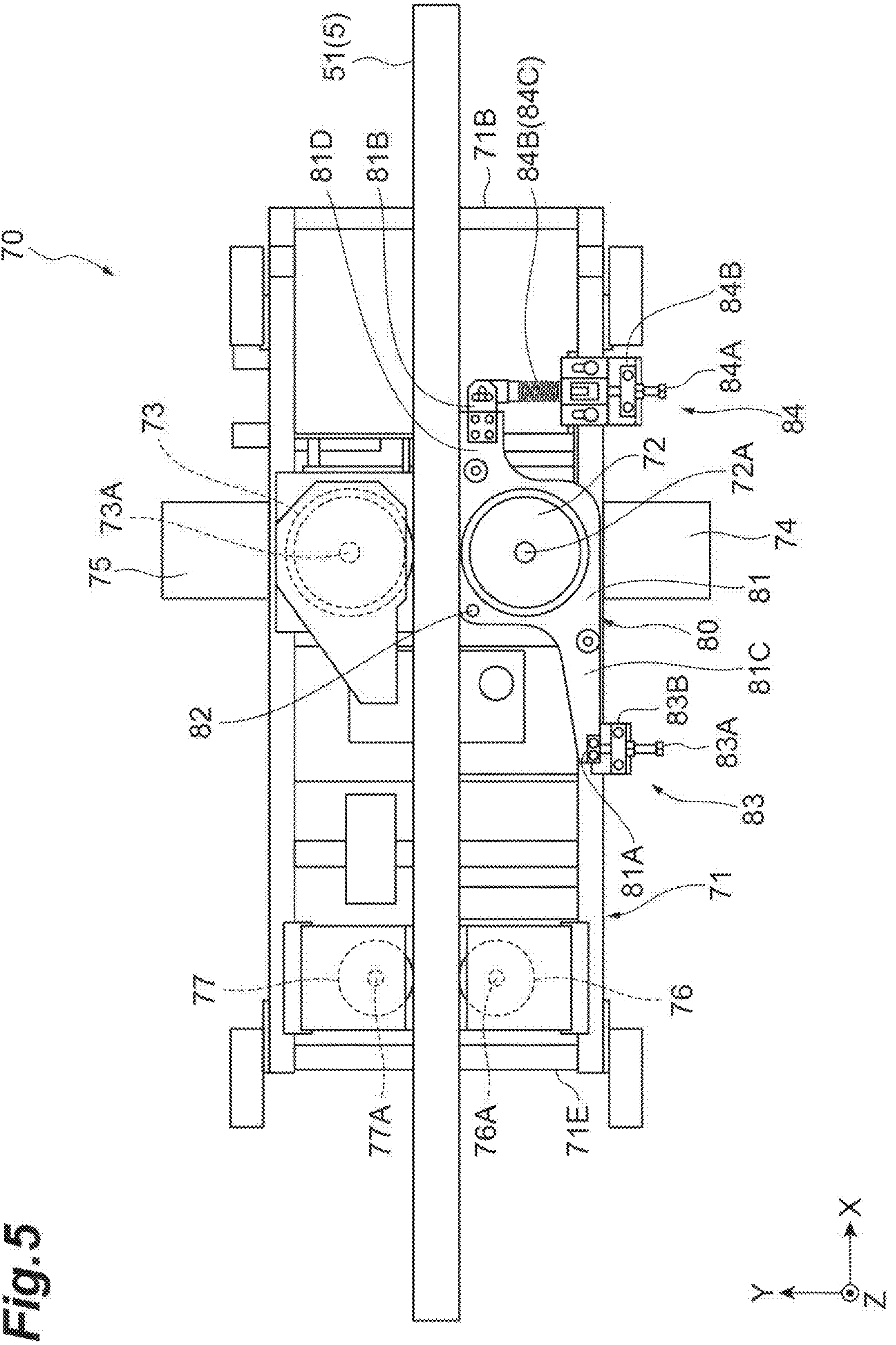
FIG. 5 is a plan view of the upper traveling portion in FIG. 3.
Figure 6:
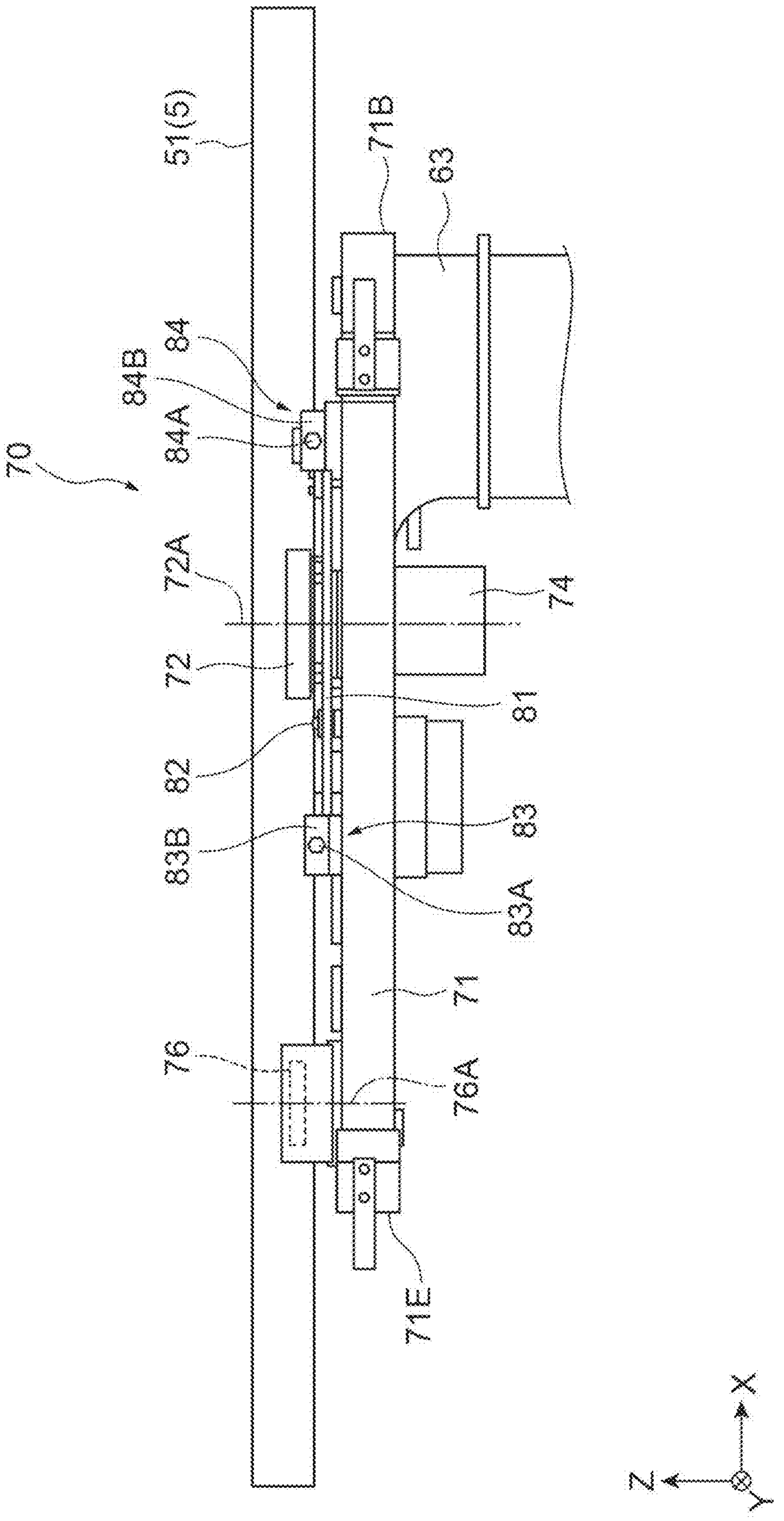
FIG. 6 is a side view of the upper traveling portion in FIG. 3.

The mover 80 is operable to adjust the contact pressure of the first drive wheel 72 against the upper rail 51. As illustrated in FIG. 4 to FIG. 6, the mover 80 includes the rotator 81, a rotating shaft 82, a first contact pressure adjuster 83, and a second contact pressure adjuster 84. In the upper traveling portion 70, the first contact pressure adjuster 83, the rotating shaft 82, the axle 72A of the first drive wheel 72, and the second contact pressure adjuster 84 are arranged in this order from the one side in the traveling direction.

The rotator 81 is rotatable about the rotating shaft 82 with respect to the upper main body 71. The rotating shaft 82 is at a position closer to the upper rail 51 than the axle 72A of the first drive wheel 72, in the Y direction. The axle 72A of the first drive wheel 72 is fixed to the rotator 81, and the first drive wheel 72 is rotatable about the axle 72A. The first drive wheel 72 provided in the rotator 81 moves along the Y direction (in the Y direction while also moving in the X direction) along with the rotation of the rotator 81. This enables the contact pressure of the first drive wheel 72 against the upper rail 51 to be adjusted. The rotator 81 includes a first projection 81C projecting toward the distal end 71E and a second projection 81D projecting toward the basal end 71B.

In the present example embodiment, when the first projection 81C is moved closer to the upper rail 51, the entire rotator 81 rotates clockwise in plan view about the rotating shaft 82, and the first drive wheel 72 becomes farther away from the upper rail 51 (that is, the first drive wheel 72 moves in a direction away from the second drive wheel 73). On the other hand, when the first projection 81C is moved away from the upper rail 51, the entire rotator 81 rotates counterclockwise in plan view about the rotating shaft 82, and the first drive wheel 72 becomes closer to the upper rail 51 (that is, the first drive wheel 72 moves in a direction closer to the second drive wheel 73). Note that the rotator 81 is biased by the second contact pressure adjuster 84 so as to rotate counterclockwise in plan view about the rotating shaft 82. Note that plan view in this context means a view viewing from above in the axial direction. In the following, when simply referring to "clockwise" or "counterclockwise," too, it means "clockwise" in plan view or "counterclockwise" in plan view.

The first contact pressure adjuster 83 is operable to move the first projection (a portion of the rotator) 81C of such a rotator 81 in the Y direction. That is, the first contact pressure adjuster 83 is operable to adjust the contact pressure of the first drive wheel 72 against the upper rail 51 by moving the first drive wheel 72 in the Y direction.

The first contact pressure adjuster 83 includes a bolt 83A and a fixed structure 83B. The bolt 83A is screwed into the fixed structure 83B. In the first contact pressure adjuster 83, by rotating the bolt 83A clockwise, the tip of the bolt 83A moves closer to the upper rail 51 and presses a block 81A of the rotator 81. This rotates the rotator 81 clockwise about the rotating shaft 82, and along with this rotation, the first drive wheel 72 becomes farther away from the upper rail 51 (that is, the first drive wheel 72 moves in a direction away from the second drive wheel 73). Consequently, a certain contact pressure state of the first drive wheel 72 against the upper rail 51 is released.

In the first contact pressure adjuster 83, by rotating the bolt 83A counterclockwise, the tip of the bolt 83A moves away from the upper rail 51. This rotates the rotator 81, which is biased to rotate counterclockwise by a compression spring 84C, counterclockwise about the rotating shaft 82, and along with this rotation, the first drive wheel 72 becomes closer to the upper rail 51 (that is, the first drive wheel 72 moves in a direction closer to the second drive wheel 73). Consequently, the first drive wheel 72 enters the certain contact pressure state against the upper rail 51.

In the present example embodiment, when the second projection 81D is moved closer to the upper rail 51, the entire rotator 81 rotates counterclockwise about the rotating shaft 82, and the first drive wheel 72 becomes closer to the upper rail 51 (that is, the first drive wheel 72 moves in a direction closer to the second drive wheel 73). On the other hand, when the second projection 81D is moved away from the upper rail 51, the entire rotator 81 rotates clockwise about the rotating shaft 82, and the first drive wheel 72 becomes farther away from the upper rail 51 (that is, the first drive wheel 72 moves in a direction away from the second drive wheel 73).

The second contact pressure adjuster 84 is operable to move the second projection (a second portion different from the first portion of the rotator) 81D of such a rotator 81 in the Y direction. That is, the second contact pressure adjuster 84 is operable to adjust the contact pressure of the first drive wheel 72 against the upper rail 51 by moving the first drive wheel 72 in the Y direction.

The second contact pressure adjuster 84 includes a bolt 84A, a fixed structure 84B, and the compression spring 84C. The bolt 84A is screwed into the fixed structure 84B. In the second contact pressure adjuster 84, by rotating the bolt 84A clockwise, the compression spring 84C provided on the tip of the bolt 84A moves closer to the upper rail 51 and presses a block 81B of the rotator 81. This rotates the rotator 81 counterclockwise about the rotating shaft 82, and along with this rotation, the first drive wheel 72 becomes closer to the upper rail 51 (that is, the first drive wheel 72 moves in a direction closer to the second drive wheel 73). Consequently, the first drive wheel 72 enters the certain contact pressure state against the upper rail 51.

In the second contact pressure adjuster 84, by rotating the bolt 84A counterclockwise, the pressing force of the compression spring 84C provided on the tip of the bolt 83A against the block 81B decreases. This enables the rotator 81 to rotate clockwise about the rotating shaft 82, and along with this rotation, the first drive wheel 72 becomes away from the upper rail 51 (that is, the first drive wheel 72 moves in a direction away from the second drive wheel 73). Consequently, the certain contact pressure state of the first drive wheel 72 against the upper rail 51 is released.

One of the first contact pressure adjuster 83 and the second contact pressure adjuster 84 is closer to the one side in the traveling direction of the upper traveling portion 70 (the X direction) than the first drive wheel 72, and the other of the first contact pressure adjuster 83 and the second contact pressure adjuster 84 is closer to the other side in the traveling direction than the first drive wheel 72. In the present example embodiment, the first contact pressure adjuster 83 is closer to the distal end 71E of the upper main body 71 than the first drive wheel 72, and the second contact pressure adjuster 84 is closer to the basal end 71B of the upper main body 71 than the first drive wheel 72.

The following describes working effects of the stacker crane 6 according to the above example embodiment. The stacker crane 6 according to the above example embodiment is provided with the first contact pressure adjuster 83 and the second contact pressure adjuster 84 to adjust the contact pressure of the first drive wheel 72 against the upper rail 51 on both sides in the traveling direction of the first drive wheel 72 and the second drive wheel 73. This enables an operator to adjust the contact pressure of the first drive wheel 72 from both sides in the traveling direction of the first drive wheel 72. For example, if the stacker crane 6 breaks down and becomes unable to travel by itself, the operator operates one of the first contact pressure adjuster 83 and the second contact pressure adjuster 84 to release the contact pressure on the upper rail 51 by the first drive wheel 72 and can move the stacker crane 6 manually. Consequently, workability when the contact pressure of the first drive wheel 72 is adjusted can be improved.

In the stacker crane 6 according to the above example embodiment, the first contact pressure adjuster 83 is operable to move the first projection 81C, which is a first portion of the rotator 81, in the Y direction, and the second contact pressure adjuster 84 is operable to move the second projection 81D, which is a second portion different from the first portion of the rotator 81, in the Y direction. With this configuration, the first drive wheel 72 can be moved in the Y direction from both sides in the traveling direction of the first drive wheel 72 by a simple configuration.

In the stacker crane 6 according to the above example embodiment, the rotating shaft 82 of the rotator 81 is closer to the upper rail 51 than the axle 72A of the first drive wheel 72, and in the upper traveling portion 70, the first contact pressure adjuster 83, the rotating shaft 82, the axle 72A of the first drive wheel 72, and the second contact pressure adjuster 84 are arranged in this order from the one side in the traveling direction (closer to the distal end 71E). This enables the contact pressure of the first drive wheel 72 to be adjusted by a simple configuration.

In the stacker crane 6 according to the above example embodiment, the first contact pressure adjuster 83 moves the first drive wheel 72 away (apart) from the upper rail 51 by moving the first projection 81C closer to the upper rail 51, and the second contact pressure adjuster 84 moves the first drive wheel 72 closer to the upper rail 51 by moving the second projection 81D closer to the upper rail 51. This enables the contact pressure of the first drive wheel 72 to be adjusted by a simple configuration.

In the stacker crane 6 according to the above example embodiment, the first drive wheel 72 is between the distal end 71E in the traveling direction of the upper traveling portion 70 (the upper main body 71) and the mast 63 in the traveling direction. In such a configuration, the first drive wheel 72 is near a central portion of the upper traveling portion 70, and the distance from the distal end 71E and the basal end 71B, which are both ends of the upper traveling portion 70, to the first drive wheel 72 is long in the traveling direction. However, in the stacker crane 6 according to the above example embodiment, the first contact pressure adjuster 83 and the second contact pressure adjuster 84 are provided on both sides of the upper traveling portion 70 in the traveling direction, and thus the contact pressure adjustment for the first drive wheel 72 can be easily performed even in a configuration in which the first drive wheel 72 is provided near the central portion of the upper traveling portion 70.

The stacker crane 6 according to the above example embodiment can improve workability when the contact pressure of the first drive wheel 72 in the upper traveling portion 70 at the upper end of the mast 63 in the vertical direction is adjusted.

Example embodiments have been described above, but the present invention is not limited to the above example embodiments. Various modifications can be made within a scope not departing from the gist of the present invention.

In the above example embodiments, configurations have been described, as examples, in which only the first drive wheel 72 out of the two first drive wheel 72 and second drive wheel 73 having the upper rail 51 therebetween is provided movably along the Y direction, but the second drive wheel 73 may also be provided movably along the Y direction in a similar manner. That is, in addition to the configuration of the stacker crane 6 according to the above example embodiments, the mover 80 dedicated to the second drive wheel 73 may be provided.

In the above example embodiments, examples have been described in which the two first drive wheel 72 and second drive wheel 73 having the upper rail 51 therebetween are provided, but a driven wheel having no driving force may be provided instead of the second drive wheel 73.

In the above example embodiments and modifications, the mover 80 to move the first drive wheel 72 in the Y direction by rotating the rotator 81 has been presented as an example and an example has been described in which the first contact pressure adjuster 83 and the second contact pressure adjuster 84 are provided to rotate the rotator 81. However, the present invention is not limited to these configurations. For example, the first drive wheel 72 may be moved in the Y direction by moving a slider in the Y direction, and the first contact pressure adjuster 83 and the second contact pressure adjuster 84 to move the slider may be provided.

In the above example embodiments and modifications, an example embodiment is applied to the upper traveling portion 70, but instead of or in addition to this configuration, an example embodiment of the present invention may be applied to the lower traveling portion 61.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stacker crane comprising:

a traveling assembly including a drive wheel being at least one of a first wheel and a second wheel opposing each other across a rail; and a mover to move the drive wheel; wherein the mover includes a first contact pressure adjuster and a second contact pressure adjuster to adjust contact pressure of the drive wheel against the rail by moving the drive wheel farther away from or closer to each other; and one of the first contact pressure adjuster and the second contact pressure adjuster being closer to one side in a traveling direction of the traveling assembly than the drive wheel and another of the first contact pressure adjuster and the second contact pressure adjuster being closer to another side in the traveling direction than the drive wheel.

2. The stacker crane according to claim 1, wherein the mover includes a rotator rotatable about a rotating shaft as a rotation center with respect to a main body of the traveling assembly and to which an axle of the first wheel is fixed; and the first contact pressure adjuster is operable to move a first portion of the rotator in a direction away from the rail or a direction closer to the rail and the second contact pressure adjuster is operable to move a second portion different from the first portion of the rotator in a direction away from the rail or a direction closer to the rail.

3. The stacker crane according to claim 2, wherein the rotating shaft is closer to the rail than the axle of the first wheel; and the traveling assembly is assembled in an order of the first contact pressure adjuster, the rotating shaft, the axle of the first wheel, and the second contact pressure adjuster from the one side in the traveling direction.

4. The stacker crane according to claim 3, wherein the first contact pressure adjuster is operable to move the first wheel away from the rail by moving the first portion of the rotator closer to the rail; and the second contact pressure adjuster is operable to move the first wheel closer to the rail by moving the second portion of the rotator closer to the rail.

5. The stacker crane according to claim 1, further comprising:

a mast at an end on the one side in the traveling direction of the traveling assembly and extending in a vertical direction; and a transfer portion movable in the vertical direction along one side surface on the other side in the traveling direction on the mast; wherein the first wheel and the second wheel are between an end on the other side in the traveling direction of the traveling assembly and the mast in the traveling direction.

6. The stacker crane according to claim 5, wherein the traveling assembly includes a lower traveling portion at a lower end of the mast in the vertical direction and an upper traveling portion at an upper end of the mast in the vertical direction; and the mover is provided in the upper traveling portion.

* * * * *